United States Patent [19]
Thor

[11] Patent Number: 5,964,881
[45] Date of Patent: Oct. 12, 1999

[54] SYSTEM AND METHOD TO CONTROL MICROPROCESSOR STARTUP TO REDUCE POWER SUPPLY BULK CAPACITANCE NEEDS

[75] Inventor: Allen Thor, Livingston, N.J.

[73] Assignee: Advanced Micro Devices, Sunnyvale, Calif.

[21] Appl. No.: 08/967,418

[22] Filed: Nov. 11, 1997

[51] Int. Cl.[6] .................................................. G06F 1/08
[52] U.S. Cl. .......................................... 713/501; 713/601
[58] Field of Search ................................... 713/300, 500, 713/501, 600, 601

[56] References Cited

U.S. PATENT DOCUMENTS

| | | |
|---|---|---|
| 4,615,005 | 9/1986 | Maejima et al. . |
| 4,758,945 | 7/1988 | Remedi . |
| 4,851,987 | 7/1989 | Day . |
| 5,237,699 | 8/1993 | Little et al. ........................ 395/182.21 |
| 5,404,546 | 4/1995 | Stewart . |
| 5,454,018 | 9/1995 | Hopkins . |
| 5,561,389 | 10/1996 | Duley ..................................... 327/143 |
| 5,590,341 | 12/1996 | Matter . |
| 5,628,001 | 5/1997 | Cepuran . |
| 5,630,110 | 5/1997 | Mote, Jr. . |
| 5,640,547 | 6/1997 | Hotta et al. . |
| 5,655,127 | 8/1997 | Rabe et al. . |

*Primary Examiner*—Dennis M. Butler
*Attorney, Agent, or Firm*—Renner, Otto, Boisselle & Sklar, P.L.L.

[57] ABSTRACT

A system for controlling a clock rate of a microprocessor which includes a core clock operatively coupled to the processor, the core clock providing the microprocessor with a core clock signal for clocking the processor. A power supply operatively coupled to the microprocessor provides power to the processor. An intelligent clock generating system provides the core clock with at least one clock signal of a plurality of clock signals to be used as the core clock signal, wherein the plurality of clock signals includes a master clock signal and at least one ramped clock signal.

26 Claims, 6 Drawing Sheets

SYSTEM AND METHOD TO CONTROL MICROPROCESSOR STARTUP TO REDUCE POWER SUPPLY BULK CAPACITANCE NEEDS

FIELD OF THE INVENTION

The invention herein described relates generally to a system and method for controlling microprocessor startup. In particular, the system and method provide for controlling a clock rate of the microprocessor in order to control startup power requirements.

BACKGROUND OF THE INVENTION

Microprocessors are sophisticated, general purpose logic devices which can be programmed to perform a wide variety of useful control functions in industrial and communications equipment, large scale and medium scale computer peripheral and terminal hardware, automobiles and other transportation media, amusement and educational devices, household appliances and other consumer goods, and the like. Generally, an entire spectrum of microprocessors is available in the commercial marketplace. As the speed of operation increases, the more valuable and more versatile the microprocessor becomes since it is capable of controlling the given operation more efficiently and more accurately, of controlling a greater number of operations simultaneously, and of controlling operations requiring relatively fast response times.

The throughput of any given microprocessor is a function of, among other things, the number of machine cycles required to execute a given set of instructions. In the course of designing any computer system, and in particular a microprocessor, a set of instructions is selected which will provide the anticipated program requirements for the projected market in which the microprocessor system is to be used. The microprocessor, executes each instruction as a sequence of machine cycles, with the more complex instructions consuming a greater number of machine cycles.

The operation of internal circuitry of the microprocessor is synchronized by means of a master clock signal applied to the microprocessor. The master clock signal may actually comprise two or even four clock components/signals (i.e., the microprocessor may be either two-phase or four-phase). During the basic clock cycle known as the machine cycle, a number of internal microprocessor related operations may take place simultaneously including the transfer of digital information from a bus to a register or vice versa, between certain registers, from an address or data buffer to a bus or vice versa, and so forth. Additionally, the individual conductors of a bus may each be set to a predetermined logic level, or the contents of a register may be set to a predetermined logic level.

Sometimes, an internal arrangement is deployed within the information processing unit utilizing a PLL (Phase Lock Loop) circuit which delays the clock signals so that the signals are in specific phase relation with desired clock signals. In other words, instead of the multi-phase clocks, the PLL circuit delivers the clock signals for controlling the logic devices. PLL circuits are usually employed to guarantee duty cycles and phase relationships to an input clock source, and PLLs may be used in microprocessors to multiply an internal clock frequency to a significantly higher internal clock frequency. For example, a typical 100 MHZ microprocessor is usually driven by a 33–66 MHZ external clock which is multiplied via a PLL to increase the clock frequency to 100 MHZ.

Conventional microprocessors can also be controlled by clock signals utilizing semiconductor integrated circuit devices having logic circuits controlled by clock signals such as "A 130 K-Gate CMOS Mainframe Chip Set" ISSCC 87, SESSION VIII, pp. 86–87, 1987 or "A 15MIPS 32b Microprocessor" ISSCC 87, SESSION II, pp. 26–27, 1987. In these microprocessor, an external clock signal input to a pad is formed into an internal clock signal through an input buffer. The clock signal is distributed by a first-stage clock buffer in the form of clock signals, and these signals are further distributed by a second-stage clock buffer in the form of clock signals to control the logic circuit blocks. In this approach, logic circuit blocks which are present throughout the semiconductor integrated circuit device and which are controlled by clock signals are divided into a plurality of blocks and a clock buffer is provided for each of the divided logic circuit blocks to supply a clock signal thereto, thereby enabling a reduction in the load which is driven by each clock buffer.

Numerous technologies and resources have been deployed to advance clocking technology with an emphasis on improving the speed of the microprocessor.

A significant clock related problem with microprocessors is power consumption. Systems for placing the microprocessor in a static or idle state have been developed in order to conserve power consumption. However, if the microprocessor is in an idle state, for example, drawing a minimal amount of power and then suddenly is awakened due to a key stroke or the like, the microprocessor transgresses from minimal speed to full speed almost immediately. This is because the clock signal driving the microprocessor is substantially at full speed when the microprocessor is awakened from an idle state. The current demand of the microprocessor is a function of operating frequency. Accordingly, as the microprocessor speeds rapidly increases from low speed to high speed, current demand by the microprocessor correspondingly increases rapidly.

In order to enable the microprocessor to transition from a minimal power state to a full power state almost instantaneously, large bulk capacitor(s) or complex power supplies are typically required. The large bulk capacitor(s) store sufficient amount of energy such that when the microprocessor is awakened the microprocessor is provided with enough current to sustain operation at full speed until a power supply for the microprocessor can adjust to the change in microprocessor load.

Generally, a microprocessor power supply takes several milliseconds to adjust to a change in microprocessor load. Because the microprocessor typically goes from almost zero power to almost full power in less than or equal to 10 nanoseconds, a capacitor which discharges rapidly is needed in order to sustain power to the microprocessor until the power supply can take over. In order for the capacitor to be able to discharge so rapidly and provide sufficient power for several milliseconds (i.e., the time needed for the power supply to adjust), the capacitor typically is relatively large in size. Attempts have been made to remedy this problem to some extent by making the power supplies more intelligent. However, since the power demand for relatively instantaneous powering of the microprocessor is high, the power supply cannot circumvent the need for the employment of large bulk capacitors without being unduly costly and complicated. A problem with having to use a large bulk capacitor or several smaller capacitors in cascade is that they occupy valuable space which is highly undesirable in this age of miniaturization. Furthermore, electromagnetic fields generated by the capacitor(s) may cause interference and hinder microprocessor performance including that related to speed.

In view of the above, there is a need in the art for a system and method which controls a clock rate of a microprocessor in order to control startup power requirements and avoid the need for large bulk capacitors and/or complex power supplies.

SUMMARY OF THE INVENTION

The present invention provides a system and method for reducing power consumed by a microprocessor when awakening from an idle state to an active state. An intelligent clock signal generator is employed to provide a ramped clock signal which serves as an alternative to a master clock signal. A clock signal multiplexer, which supplies a microprocessor core clock with a clock signal, discriminates between the master clock signal and the ramped clock signal. If the microprocessor is awakening from an idle state, the multiplexer provides the core clock with the ramped clock signal. The ramped clock signal provides for gradually increasing power consumption by the microprocessor at a rate which corresponds to the amount of power a power supply can provide while it is adjusting to accommodate the change in microprocessor load. In other words, the ramped clock signal results in a ramped microprocessor load that corresponds to the power supply's adjustment to the microprocessor load. After the ramped clock signal reaches full speed, the clock signal multiplexer switches to the master clock signal.

Thus, the present invention provides for a system which reduces power consumption by the microprocessor when going from an idle state to an active state. As a result of gradually ramping up the clock signal, the power supply is able to power the microprocessor during the transition from the idle state to the active state. Consequently, the need for conventional bulk capacitors is reduced or eliminated because the need for an almost instantaneous full-power supply is avoided. Furthermore, the present invention eliminates the need for complex power supplies which are often needed in conventional microprocessor systems in order to handle typical microprocessor loads when going from an idle state to an active state.

A microprocessor transitioning from an idle state to an active state in accordance with the present invention would take approximately several milliseconds (i.e., the time required for the microprocessor power supply to adjust to the change in microprocessor load) to run at peak frequency as compared to a couple of nanoseconds in a conventional microprocessor system. The difference between several milliseconds and a couple of nanoseconds for a microprocessor to reach peak operating frequency is substantially indiscernible to a user. As a result, a user of a microprocessor system in accordance with the present invention would not experience any significant loss of microprocessor performance.

In accordance with one specific aspect of the present invention a system for controlling an operating frequency of a microprocessor is provided, including: a core clock operatively coupled to the microprocessor, the core clock providing the microprocessor with a core clock signal for clocking the processor, wherein the core clock signal increases in frequency over time so as to increase the operating frequency of the microprocessor over time.

In another aspect of the present invention, a system for controlling a clock rate of a microprocessor is provided, including: a core clock operatively coupled to the processor, the core clock providing the microprocessor with a core clock signal for clocking the processor; a power supply operatively coupled to the processor, the power supply providing power to the processor; and an intelligent clock generating system for providing the core clock with at least one clock signal of a plurality of clock signals to be used as the core clock signal, wherein the plurality of clock signals includes a master clock signal and at least one ramped clock signal.

Another specific aspect of the present invention provides for a method for regulating microprocessor power requirements, including the steps of: using a core clock to provide the microprocessor with a core clock signal for clocking the processor; using a power supply to provide power to the processor; and using an intelligent clock generating system to provide the core clock with at least one clock signal of a plurality of clock signals to be used as the core clock signal, wherein the plurality of clock signals includes a master clock signal and at least one ramped clock signal.

According to another particular aspect of the present invention, a system for controlling a clock rate of a microprocessor is provided, including: a core clock operatively coupled to the processor, the core clock providing the microprocessor with a core clock signal for clocking the processor; a power supply operatively coupled to the processor, the power supply providing power to the processor; and an intelligent clock generating system for providing the core clock with at least one clock signal of a plurality of clock signals to be used as the core clock signal, wherein the plurality of clock signals includes a master clock signal and at least one ramped clock signal, the intelligent clock generating system including: a signal stabilizer for stabilizing the master clock signal; a clock select multiplexer adapted to provide the core clock with one of the master clock signal or the at least one ramped clock signal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4b is a graph illustrating a change in current demand over time of the conventional microprocessor of FIG. 4a;

DETAILED DESCRIPTION OF THE INVENTION

Figure 1:
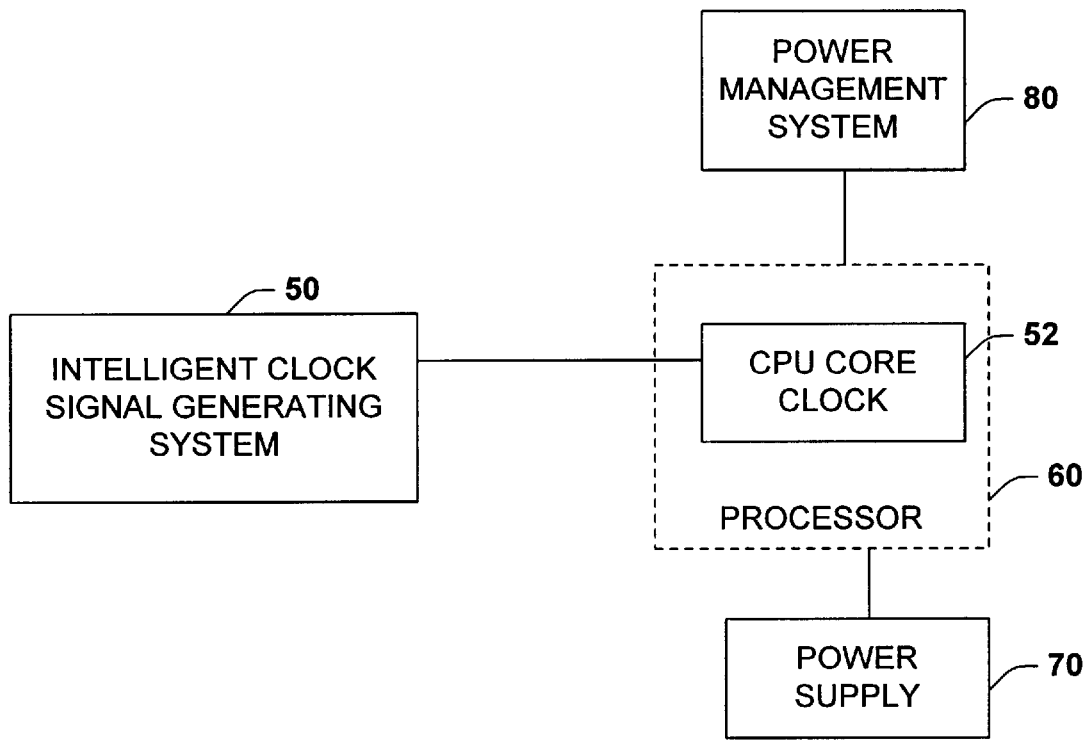
FIG. 1 is a schematic block diagram illustrating an intelligent clock signal generating system in accordance with one specific aspect of the present invention.

The present invention will now be described with reference to the drawings, wherein like reference numerals are used to refer to like elements throughout.

Referring initially to FIG. 1, a schematic block diagram illustrating an intelligent clock signal generating system 50 in accordance with one specific aspect of the present invention is shown. The intelligent clock generating system 50 is operatively coupled to a core clock 52 located in a microprocessor 60. It will be appreciated that the core clock 52 may be located outside of the microprocessor 60 as well. The microprocessor 60 is powered by a power supply 70 operatively coupled thereto. Furthermore, the microprocessor 60 is operatively coupled to a power management system 80. The power management system 80 serves to optimize power consumption by placing the microprocessor 60 in an idle state during periods of non-use as is well known in the art.

The intelligent clock generating system 50 provides the core clock 52 with a clock signal which is used to drive the microprocessor 60. If the microprocessor 60 is operating in an active mode, the intelligent clock generating system 50 provides the core clock with a clock signal having a frequency suitable for driving the microprocessor 60 in the active mode. However, if the microprocessor 60 is transitioning from an idle state to the active state, the intelligent clock generating system 50 provides the core clock 52 with a clock signal having a frequency which provides for gradually increasing the operating speed of the microprocessor 60. More particularly, the intelligent clock generating system 50 generates a clock signal of increasing frequency up to an active state running frequency as the microprocessor 60 is transitioning from the idle state to the active state. The frequency of the microprocessor is increased in a substantially linear or ramped fashion during the transition from the idle state to the active state.

As a result of gradually increasing the operating frequency of the microprocessor 60, the current demand by the microprocessor 60 during the transition from the idle state to the active state will gradually increase as opposed to rapidly increasing as in conventional microprocessor systems. Since the current demand is a function of the operating frequency of the microprocessor 60, by gradually increasing the frequency of the clock signal driving the microprocessor current demand can be controlled. The present invention controls the frequency of the clock signal driving the microprocessor such that the power supply 70 can autonomously provide sufficient power to power the microprocessor 60 during the transition from idle state to active state with satisfactory regulation. As a result, the need for a bulk capacitor (which typically provide power to power a conventional microprocessor during the transition from idle state to active state) is reduced or eliminated.

Figure 2:
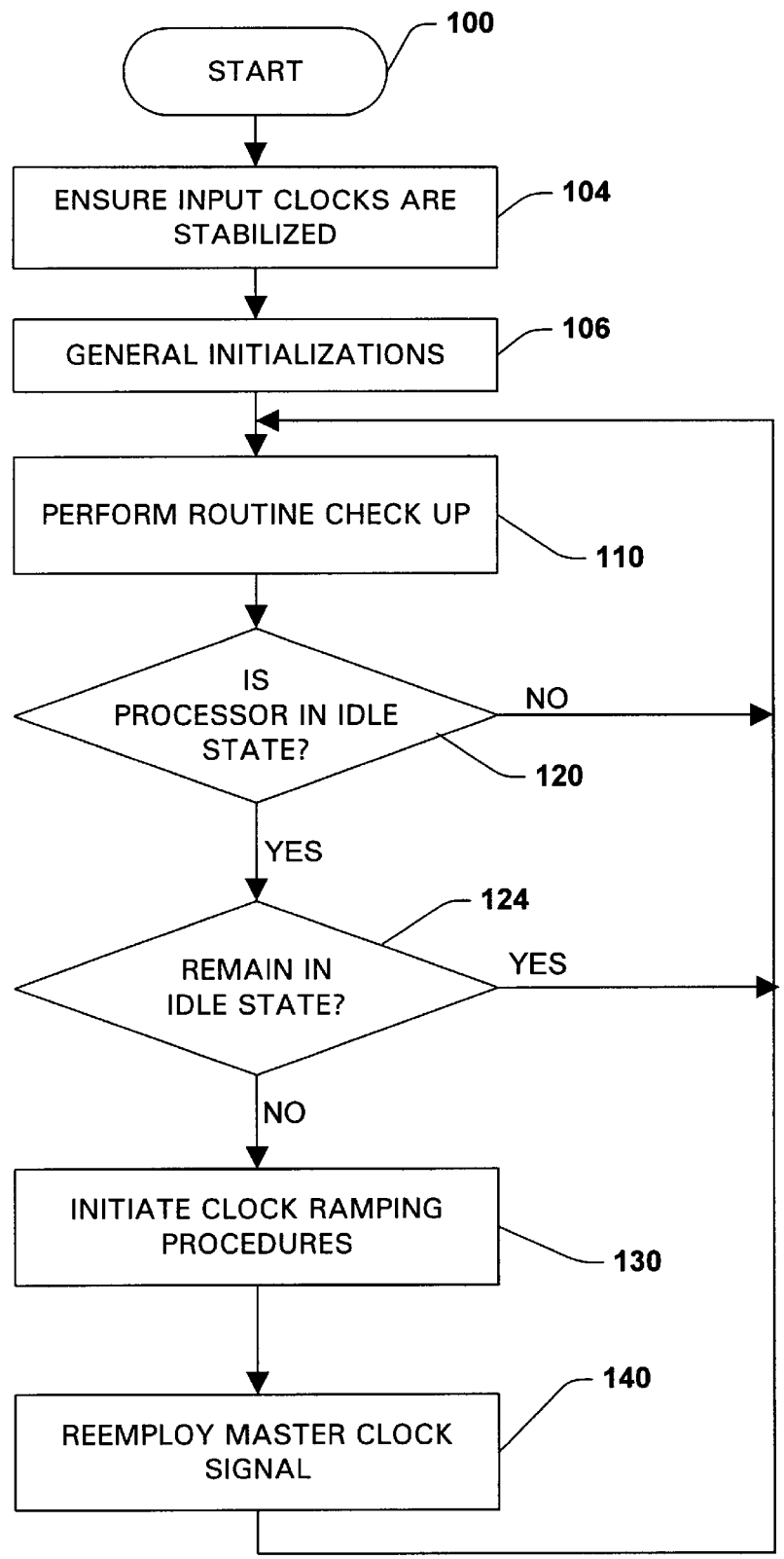
FIG. 2 is a level flow diagram of one particular methodology for carrying out the present invention.

Turning now to FIG. 2, a flow chart is shown illustrating the general methodology of one specific aspect of the present invention. In step 100, the microprocessor 60 is powered up via an ON/OFF switch or the like. In step 104, the microprocessor 60 ensures that input clock signals for the microprocessor are stabilized. The microprocessor 60 is usually controlled by a clock oscillator (not shown) which delivers an original clock signal to a clock generator (i.e., core clock 52) which generates clock signals required to control logic devices in the microprocessor 60. The logic devices are controlled by the clock signals so as to operate in timed relation to each other.

A PLL (Phase Lock Loop) circuit 108 (FIG. 3) which delays the clock signals so that the signals are in specific phase relations is employed. Although conventional clocks have been improved to power up almost instantaneously, they are still considerably slower than the microprocessor 60. Consequently, it is highly desirable to wait for the clocks to settle before any activities are carried out by the microprocessor 60. As will be discussed in greater detail below, the PLL circuit 108 is employed to settle the clock signal. When the clock signal is stabilized, the PLL circuit 108 outputs a stabilized clock signal which is employed by the core clock 52 to run the microprocessor 60 and logic devices at full speed.

Next, in step 106 the microprocessor 60 performs any generalizations, and self initialization routines typically carried out by microprocessors.

After step 106, the process proceeds to step 110 where the microprocessor 60 performs routine checkups to determine the status of the microprocessor 60. In step 120, it is determined whether the microprocessor 60 is running at full speed or is idle (e.g., sleep mode). If the microprocessor 60 is running at full speed, the microprocessor 60 consumes full power to carry out its tasks and the process is returned to step 110 to wait for the next scheduled routine checkup. If the microprocessor 60 is active (i.e., running at full speed) it is running at the clock rate (i.e., master clock signal) output by the PLL circuit 108. In this active state, the microprocessor 60 is at full load and requires full power to be supplied thereto.

If in step 120 it is determined that the microprocessor 60 is in an idle state (i.e., power consumption is significantly reduced), the process proceeds to step 124 where it is determined whether the microprocessor 60 is 'waking up' or will remain idle. If the microprocessor 60 is to remain in the idle state the process returns to step 110. If in step 124 the microprocessor 60 is waking up from the idle state as a result of a key stroke or mouse movement, for example, the process proceeds to step 130. In step 130, clock ramping procedures are initiated. As will be discussed in greater detail below, an alternative ramped clock signal is employed during the waking up period to gradually increase the clock rate of the microprocessor 60. This gradual increasing of the clock rate provides for the power supply 70 to be able to meet the load requirements of the microprocessor 60 during the wake up period without the need for large bulk capacitors.

Once the clock rate of the microprocessor has been ramped up to full speed, the process proceeds to step 140 where the master clock signal output by the PLL circuit 108 is re-employed to clock the microprocessor 60 at full-speed—then, the process returns to step 110. It is to be appreciated that the determination of the aforementioned states (e.g., active, idle, transitioning from idle to active, etc.) of the microprocessor 60 may be determined by the power management system 80, for example, or any suitable system, device or means.

Figure 3:
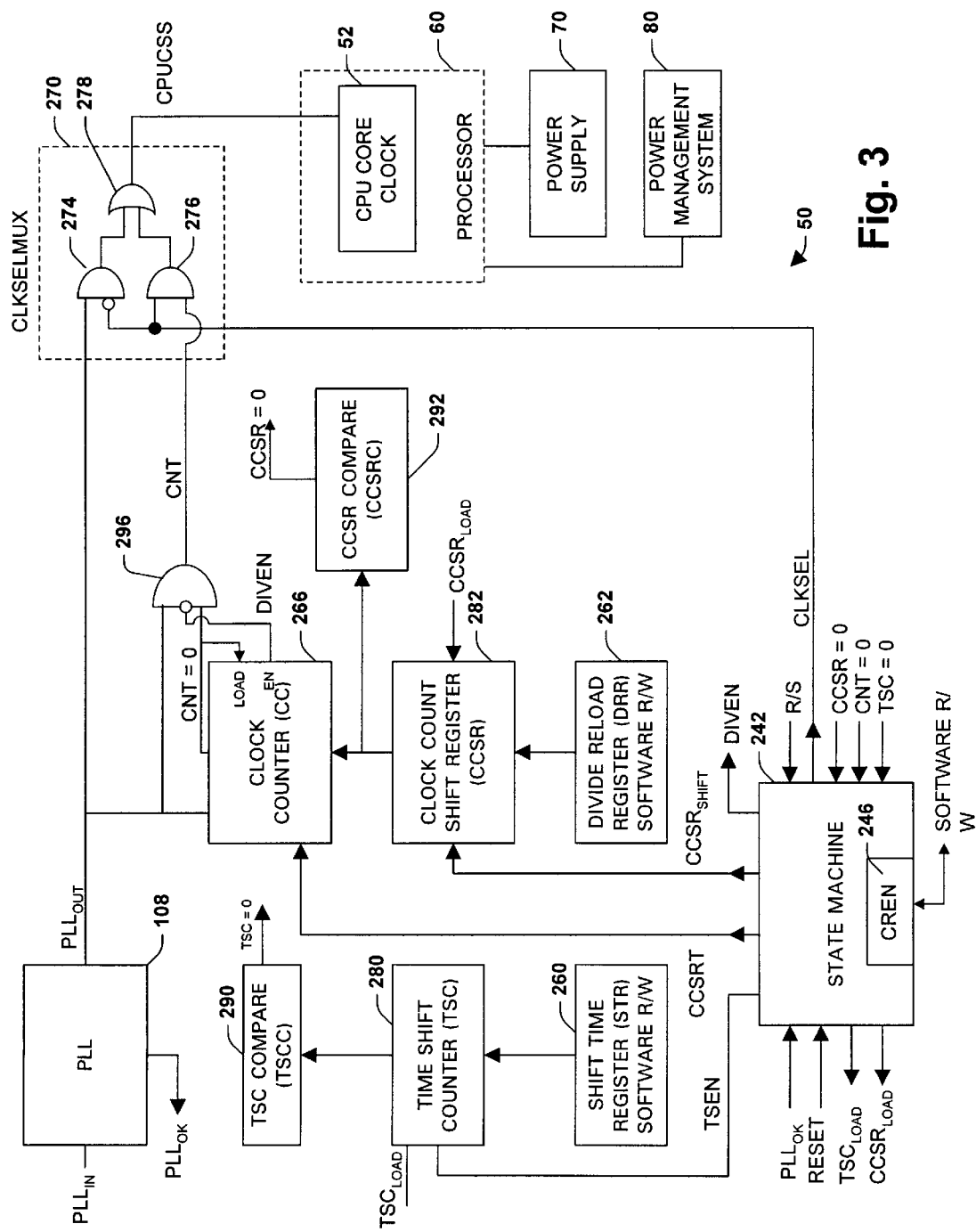
FIG. 3 is a detailed schematic block diagram illustrating an intelligent clock signal generating system in accordance with the present invention.

Turning now to FIG. 3, a detailed block diagram of the present invention is shown, illustrating greater details of the intelligent clock signal generator 50 which provides for controlling the delivery of a clock signal to the microprocessor 60 in order to eliminate costly and inefficient capacitors and power supplies. When the microprocessor 60 is initialized upon power up via ON/OFF switch or the like, an incoming clock signal is generated. The conventional clock circuits employed in the microprocessors today mostly include the technologies discussed in the background of the invention to provide instant stability of the clocks. In the exemplary embodiment, the PLL circuit 108 is employed to ensure clock stability. However, based on the discussion herein, it will be readily apparent to one skilled in the art to weigh the advantages and disadvantages of different clock control mechanisms and to select one suitable to carry out the present invention. Accordingly, it is to be appreciated that the scope of the present invention is intended to include all such suitable clock mechanisms.

When the PLL 108 is in lock and $PLL_{OUT}$ is stable, a $PLL_{OK}$ signal is sent by the PLL 108 to a state machine 242. When a microprocessor based system is initially powered up, a RESET is generated outside the microprocessor 60 by a mechanism external to the microprocessor 60 but within the realm of a system employing the microprocessor 60. The RESET is input to the state machine 242 causing the state machine 242 to set a clock select (CLKSEL) to zero, which enables $PLL_{OUT}$ from clocking the CPU core clock 52. When system power has stabilized, the RESET signal becomes inactive allowing the system to run from a known state.

A clock ramp enable bit (CREN) 246 within the state machine 242 is also disabled by the RESET being active, preventing the intelligent clock signal generating circuit 50 from operating upon initial microprocessor 60 power up. In addition, the microprocessor 60 sends a run/stop (R/S) signal to the state machine 242 indicating the active state. After power on self test 106, a Basic Input/Output System (BIOS) (not shown) is enabled to program a shift time register (STR) 260 and a divide reload register (DRR) 262 with pre-determined values. The predetermined values may initially be set up using software read/write procedures as is well known in the art.

The shift time register (STR) 260 is a register storing the desired length of time for the microprocessor 60 to ramp up to full power. For example, assuming that $PLL_{OUT}$ is 100 MHz, and the power consumption of the microprocessor 60 is 50 ma/MHz, at full speed the microprocessor 60 would draw 5 Amps. Then, if it is desired to ramp to 100 MHz in 5 ms, the shift time register (STR) 260 should be loaded with the value of 100. The value for the shift time register (STR) 260 may be determined using the following equation.

$$STR = \frac{PLL_{OUT} * I_{CONSUMPTION}}{I_{CPU}}$$

$$STR = \frac{(100\text{MHz}) * (50\text{mA/MHz})}{5A}$$

$$STR = 100$$

In addition, the divide reload register (DRR) 262 is a register storing the desired steps to achieve full power-up. The DRR 262 defines the initial CPU clock frequency when going from an idle to active mode. The time between steps is defined by the lowest operating frequency of the ramp. As a result, utilizing the same numbers discussed above with respect to the shift time register (STR) 260, the divide reload register (DRR) 262 should be initialized at a value of 5000. This value is obtained by the following equation:

$$DRR = \frac{TOTALTIME * PLL_{OUT}}{STR}$$

$$DRR = \frac{(5\text{ms}) * (100\text{MHz})}{100}$$

$$DRR = 5000$$

When the microprocessor 60 enters into an idle state such as when a screen saver kicks in or when the screen goes blank due to power management, power supply to the microprocessor 60 is decreased to a minimum value in order to conserve power, and the run/stop signal (R/S) is disabled, wherein the state machine 242 may stop the PLL circuit 108 if so desired to reduce power. When the state machine 242 receives the R/S=0 signal, the state machine 242 sets the clock select (CLKSEL) to one and the divide enable (DIVEN) to zero. This selects the output of the clock counter (CC) 266 as the source of the CPU clocking signal and disables the clock counter (CC) 266 from counting during the idle state. At this point in time, the clock counter (CC) 266 is stopped, and the invention is ready to initiate ramping as soon as R/S=1.

The selection of a CPU core clock signal (CPUCCS) to be used by the CPU core clock 52 is determined by a logic gate clock select multiplexer (CLKSEL MUX) 270. In other words, the logic gate clock select multiplexer (CLKSEL MUX) 270 determines whether to use the $PLL_{OUT}$ signal or a clock counter signal (CNT) as the CPU core clock signal (CPUCCS). The multiplexer (CLKSEL MUX) 270 includes two AND gates 274 and 276 and an OR gate 278. The two AND gates 274 and 276 provide for the selection of one of two possible core clock signals (i.e., $PLL_{OUT}$ signal or the clock counter signal (CNT)). The first AND gate 274 is provided with $PLL_{OUT}$ signal and a negated clock select (CLKSEL) signal.

The clock select (CLKSEL) is turned on (i.e., high) due to the microprocessor 60 entering into an idle state. This high signal is negated by the AND gate 274 which results in the AND gate 274 not outputting the $PLL_{OUT}$ signal to the OR gate 278.

When the clock select (CLKSEL) is disabled (or low), the microprocessor 60 is running in full power mode. This low signal is negated by the AND gate 274 and thus the $PLL_{OUT}$ signal is output to the OR gate 278 and used as the core clock signal 269.

The second AND gate 276 provides the second alternative input clock signal. The second AND gate 276 is coupled to the clock select (CLKSEL) and the clock counter signal (CNT). This AND gate 276 functions in a converse manner to AND gate 274. In other words, when the clock select (CLKSEL) is turned on (representing that the microprocessor 60 is in an idle state) the AND gate 276 outputs the clock counter signal (CNT) to OR gate 278 for use as the core clock signal 269. When the clock select (CLKSEL) is disabled (i.e., low), representing that the microprocessor 60 is running in full power mode, the AND gate 276 does not output clock counter signal (CNT). As can be readily seen, the signal output to the OR gate 278 is a function of whether the clock select (CLKSEL) is high or low (corresponding to whether the microprocessor 60 is operating in full-power mode or is in an idle state or awakening state). The OR gate 278 outputs to the CPU core clock whichever signal ($PLL_{OUT}$ signal or clock counter signal (CNT)) is input thereto. The CPU core clock 52 thus uses the $PLL_{OUT}$ signal to drive the microprocessor 60 if the microprocessor 60 is operating in full-power mode. If the microprocessor 60 is operating in an idle state or is waking up from an idle state, the CPU core clock 52 uses the clock counter signal (CNT) to drive the microprocessor 60.

Since the clock counter signal (CNT) is a ramped signal, the load of the microprocessor 60 will ramp in correspondence with the ramped clock counter signal (CNT). As a result, the power supply 70 of the microprocessor 60 will be able to meet the load demands of the microprocessor 60 in the absence of large bulk capacitor(s). Furthermore, this feature of the present invention allows for the employment of a relatively simple power supply.

Still referring to FIG. 3 the generation of the clock counter signal (CNT) will be discussed. When an input such as a keystroke or a mouse movement is detected, the microprocessor 60 tries to move from an idle state to an active state (where the microprocessor 60 is running at full speed and full capacity). At detection of such an input, the microprocessor 60 sends to the state machine 242 a run/stop signal (R/S) equal to 1, indicating return to an active state. If the PLL 108 was previously disabled, it must now be restarted and the state machine 242 must wait for $PLL_{OK}$ to become active. The state machine 242, enabled by the run/stop signal (R/S), preloads the time shift counter (TSC) 280 and a clock count shift register (CCSR) 282 via $TSC_{LOAD}$ and $CCSR_{LOAD}$, respectively. The time shift counter (TSC) 280 is a synchronous counter which counts intervals of real time. The clock count shift register (CCSR) 282 is a register which stores descending values to reload into the clock counter (CC) 266 while ramping is active. Uses of the clock count shift register (CCSR) 282 will become apparent as is discussed below in more detail in relation to the embodiment of clock counter (CC) 266.

Thus, when the time shift counter (TSC) 280 is enabled, it retrieves a pre-stored counter value from the shift time register (STR) 260, and when the clock counter shift register (CCSR) 282 is enabled, the clock count shift register (CCSR) 282 retrieves a pre-stored step value from the divide reload register (DRR) 262. Loading the values from the respective registers allows the time shift counter (TSC) 280 and the clock count shift register (CCSR) 282 to be ready for count downs to full power up stage.

The state machine 242 also resets the clock counter (CC) 266, allowing the clock count signal (CNT) to pass from AND gate 296 to and through the clock select multiplexer (CLKSELMUX) 270, providing the microprocessor core clock 52 a clock signal. Immediately after resetting the clock counter (CC) 266, the state machine 242 enables the time shift counter (TSC) 280 via time shift counter enable (TSEN), and divide enable (DIVEN) also becomes high, enabling the clock counter (CC) 266 to count. As discussed below in more detail in relation to FIGS. 5a–6b, the time shift counter (TSC) 280 could either count incrementally or decrementally or by a predetermined power function. One skilled in the art could readily determine which count methodology is appropriate for a given implementation of the present invention. For the purpose of illustration only, the time shift counter (TSC) 280 in the exemplary embodiment counts decrementally.

The clock counter (CC) 266 divides the stable $PLL_{OUT}$ clock by the value preloaded from the clock count shift register (CCSR) 282. Once the clock counter (CC) equals zero, the gate 296 allows one pulse of the $PLL_{OUT}$ to pass through to the CLKSELMUX 270. At the same time, the $CCSR_{LOAD}$ signal is active which allows the clock counter (CC) 266 to be reloaded with current values in the clock count shift register (CCSR) 282. By doing this, the output of the clock counter (CC) 266 is no longer zero at completion of the load which prevents additional clock pulses from being output from the gate 296. Thus, the clock counter (CC) 266 provides for dividing the $PLL_{OUT}$ clock signal to provide a clock signal to the core clock 52 that is some fractional value of the peak $PLL_{OUT}$ frequency. The frequency at which each single clock pulse is output from the gate 296 may be programmable via software (e.g., the value in the divide reload register (DRR) 262). The clock counter (CC) 266 counts down the time it takes to complete the power up.

When time shift enable (TSEN) equals 1, the time shift counter (TSC) 280 counts down from the value loaded from the shift time register (STR) 260. Eventually, the time shift counter (TSC) 280 counts down to 0 which matches the time shift counter compare (TSCC). At this point, the time shift counter compare (TSCC) 290 notifies the state machine 242 that time shift counter (TSC) 260 has counted to 0. Then, as discussed above, the state machine 242 shifts the clock count shift register (CCSR) 282 right arithmetically (or countdown) the value in the clock count shift register (CCSR) 282, which creates a fast ramp by a power of 2 or a slower, linear ramp respectively.

When the clock counter (CC) 266 counts down to zero, another signal CNT passes from AND gate 296 to and through the clock select multiplexer (CLKSEL MUX) 270, giving the microprocessor core clock 52 another clock pulse (CPUCSS). At the same time, the new shifted value in the clock count shift register (CCSR) 282 is reloaded into the clock counter (CC) 266, replacing the zero value. When the clock count is not equal to zero, no pulses are output from the gate 296.

The clock count shift register (CCSR) 282 is reduced every time the time shift counter (TSC) 280 counts down to 0. Eventually, the clock count shift register (CCSR) 282 is reduced to 0, it is set to true via the clock count shift register compare (CCSRC) 292. An '1' signal is sent to the state machine 242 indicating the clock count shift register (CCSR) 282 has counted down to 0. The state machine 242 then disables the clock select (CLKSEL) allowing the constant $PLL_{OUT}$ clock signal 228 to pass through the clock select multiplexer (CLKSELMUX) 270, allowing the microprocessor 60 to return running at full clock speed.

Thus, the above process provides for changing the frequency of CPUCSS over time intervals to result in a ramped clock signal as shown in FIGS. 5a–6b, which may be used as an alternative to $PLL_{OUT}$. The rate of ramping may be set to be in accordance with the time required by the power supply 70 to adjust to the power needs of the microprocessor 60 when going from an idle state to an active state.

As a result, of the present invention providing the CPU core clock 52 with alternative clock signals, the power supply 70 can meet the power demands of the microprocessor 60 as it transgresses from an idle state to an active state.

Turning to FIGS. 4a, 4b, 5a, 5b, 6a and 6b, a conventional and two exemplary embodiments are shown illustrating the relationships between the clock count shift register (CCSR) 282 and the amount of energy required to ramp up the microprocessor. As discussed previously, the clock count shift register (CCSR) 282 loads the pre-stored value from the divide reload register (DRR) 262. In other words, the clock count shift register (CCSR) 282 stores the desired time between clock pulses, and this time decreases as the value in the CCSR 282 decreases. As this time between clock pulses decreases, the frequency of CPUCSS increases until full speed is achieved. As FIGS. 4a, 4b, 5a, 5b, 6a and 6b illustrate, the less steps chosen to ramp up the power, the more current is required in each step, putting the burden on the power supply. When the power supply 70 cannot single-handedly supply the tremendous amount of power required to ramp up the microprocessor 60 from idle state, bulky, complex, and expensive circuits and capacitors may be required.

Figure 4A:
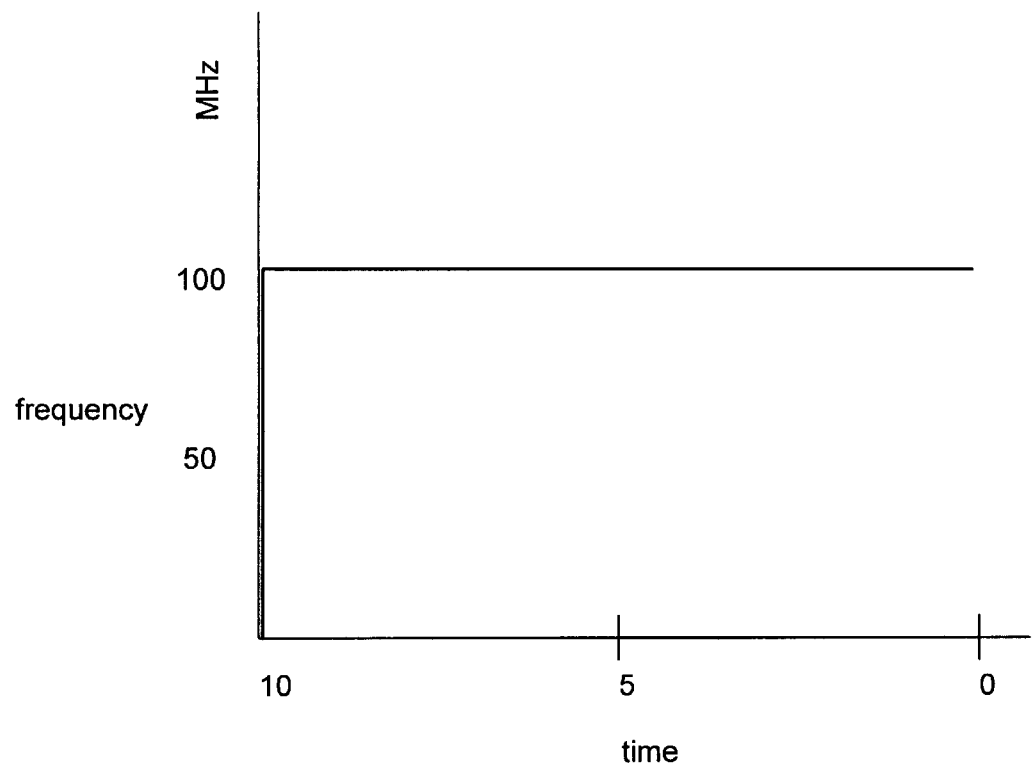
FIG. 4a is graph illustrating a change in operating frequency with respect to time of a conventional microprocessor going from an idle state to an active state.
Figure 4B:
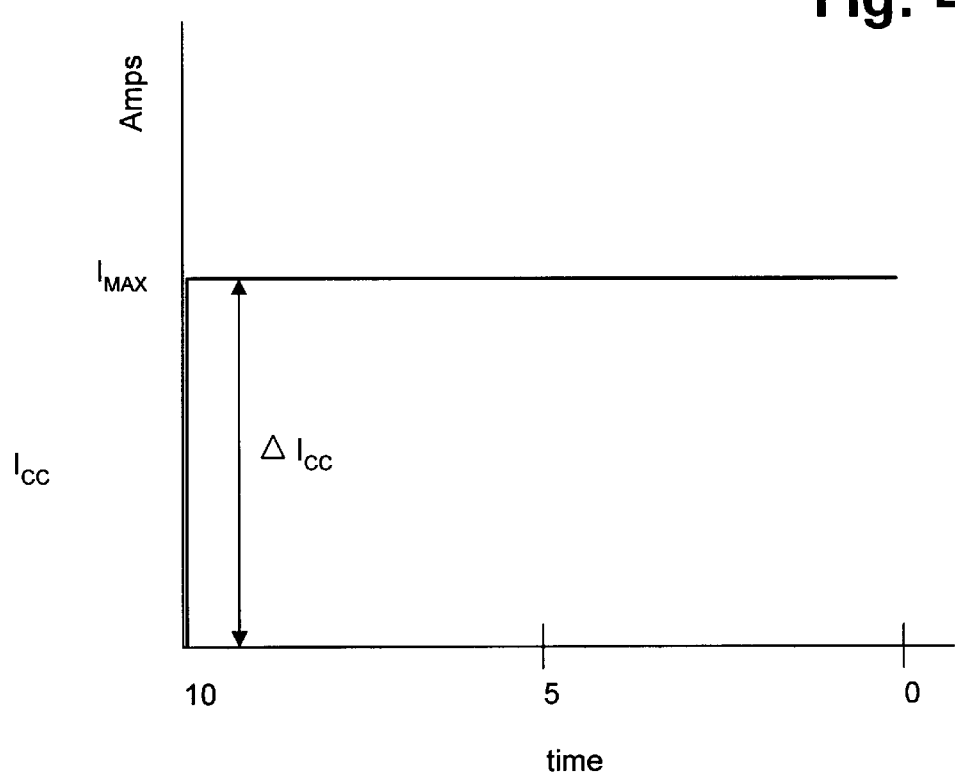

Referring specifically to FIGS. 4a and 4b, the amount of current required to start up a conventional microprocessor from idle state is shown. The conventional microprocessor ramps up to full power from idle state in one single step. In other words, the microprocessor upon detection of an input such as a mouse movement or the like during idle stage, tries to ramp up to full power in only 1 step. If the microprocessor normally runs at 100 MHz (PLL$_{OUT}$=100 MHz), the microprocessor is required to run from virtually 0 MHz to 100 MHz in less than or equal to ten nanoseconds. As one skilled in the art understands, most of the power supplies available in the marketplace today are incapable of supplying such large amount of current in such short amount of time. Consequently, expensive and space-consuming circuits and capacitors discussed above are often required if ramping in only 1 step is chosen.

Figure 5A:
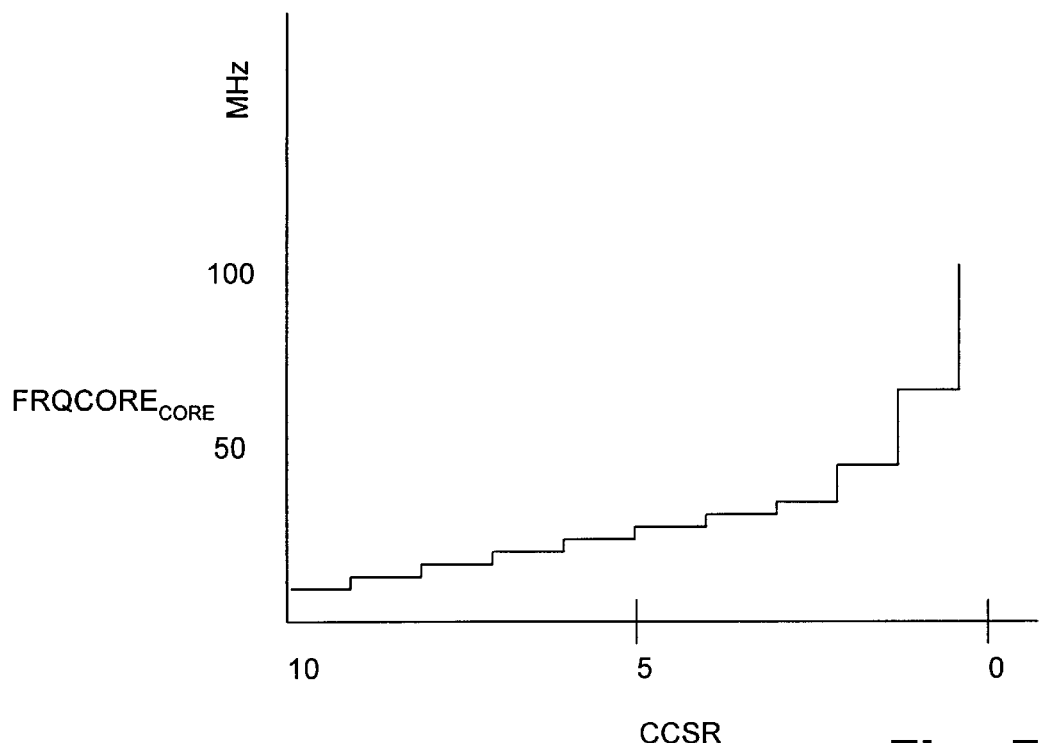
FIGS. 5a and 5b are graphs illustrating the gradually increasing current requirements of a microprocessor employed in a microprocessor system in accordance with the present invention.
Figure 5B:
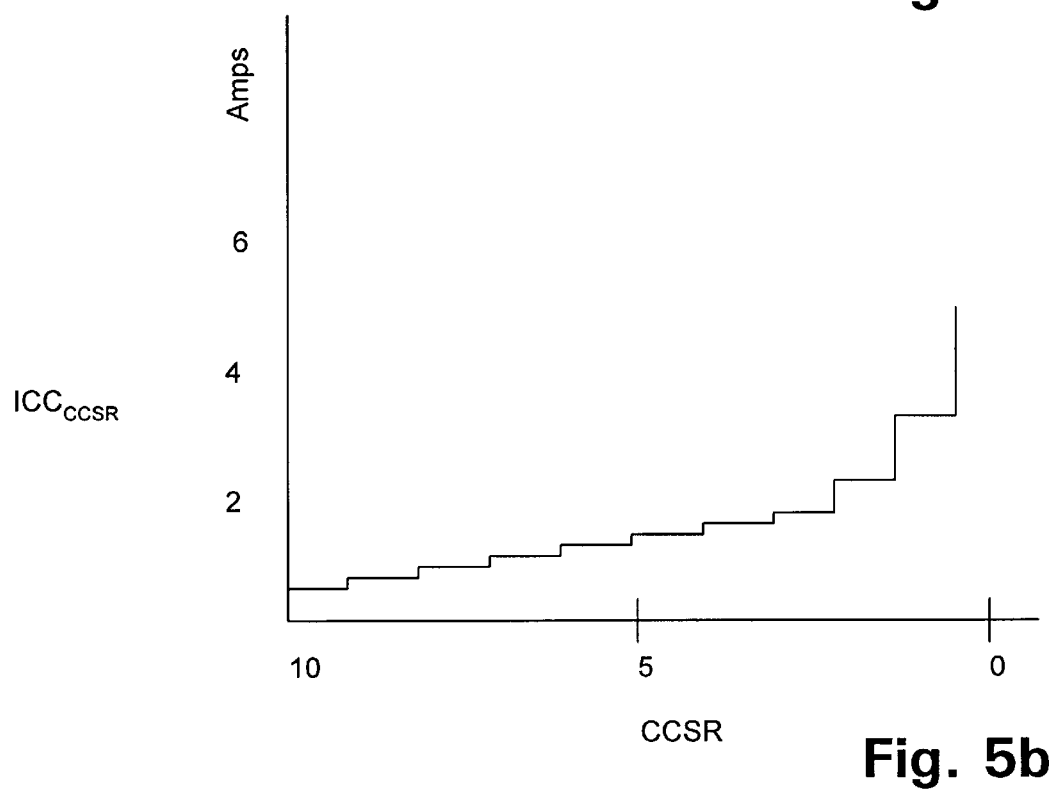

Turning now to FIGS. 5a and 5b, the amount of current to start up a microprocessor 60 employing an exemplary embodiment of the present invention is shown. Instead of ramping the microprocessor 60 up to full power in 1 step, the divide reload register (DRR) 262 is configured to the value of 10. In other words, the clock count shift register (CCSR) 282 takes on the value of 10 and ramps up the microprocessor 60 in 10 steps. Using the following equation, one skilled in the art could easily determine the total time available before the power supply is required to operate in full power, such as for example 10 milliseconds using a 1 millisecond time step.

TOTALTIME=TIMESTEP*DRR (sec)

or a function of time-step multiplied by the divide load register (DRR) 262, wherein the time-step may be determined as follows:

$$\text{TIMESTEP} = \frac{TSC}{PLL_{OUT}}$$

that is the time shift counter (TSC) 280 divided by the stabilized clock signal PLL$_{OUT}$. Thus, the total time to ramp up the power supply to full power is 10 ms, which to a human eye is practically an undiscernible amount of time. Thus, a 10 ms delay in starting up the microprocessor 60 from an idle state is acceptable to a human eye, while the delay also buys more time for the power supply 70 to ramp up to full power.

One problem with the exemplary embodiment employed for FIGS. 5a and 5b might arise during the last step of ramping the microprocessor 60 to full power. As FIGS. 5a and 5b illustrate, when the clock count shift register (CCSR) 282 counts down from 1 to 0, the amount of frequency changed in the microprocessor core clock 52 is:

$$FRQCORE_{CCSR} = \frac{PLL_{OUT}}{CCSR} \text{ Hz}$$

or 50 MHz. The amount of current required by the power supply 70 is $$ICC_{CCSR} = \frac{PLL_{OUT} * \text{CURRENT}}{CCSR} \text{ Amps}$$

or 2.5 Amps for a microprocessor consuming 5 Amps running at 100 MHz at full power. As one skilled in the art can appreciate, providing 2.5 Amps in 1 millisecond still may be a substantial burden on the power supply 70. A more expensive power supply capable of generating 2.5 Amps in 1ms might be necessary, or capacitors might still be needed to store the power required during the last step of power ramping. Although the capacitors required in this case would be significantly less bulky and less cumbersome than the large bulk capacitors required in a conventional microprocessor system, the capacitors required in this case could still be costly and space-consuming. Thus, increasing the amount of steps to ramp up the power could solve this problem. When taking steps of 15, the divide reload register (DRR) 262 and the clock count shift register (CCSR) 282 loads the value of 15, the allotted time for the power supply 70 to ramp up to full power at the last step of ramping is 15 ms. If taking steps of 20, the allotted time increases to 20 ms. With more time allotted, the power supply 70 could provide the amount of power required to activate the microprocessor 60 from an idle state to a full power state without integrating complex circuit designs or expensive and cumbersome capacitors in connection with the microprocessor 60.

However, another problem inherent in the exemplary embodiment employed in FIGS. 5a and 5b is the speed problem. Although it is true that with more steps chosen to ramp up the microprocessor 60 affords for using a less expensive and thus slower power supply 70, choosing steps which makes the ramp time become greater than 20 ms may become undesirable because human eyes may start picking up delays associated with the response time of the microprocessor 60. In other words, although it is feasible to choose as many steps as it takes for the power supply 70 to ramp up to full power, microprocessor users could start sensing delays in the operation of the microprocessor 60 if too many ramping steps are chosen. In instances such as these when ramping in the steps of 10 or even 15 is still not enough to provide adequate time for the power supply 70 to adjust to functioning at a full power demand, an increase in steps might decrease the functionability of the microprocessor 60. One solution is to multiply the stable clock frequency (PLL$_{OUT}$) with an integer number and then divide by the same integer number in order to decrease the amount of power output required from the power supply 70, as illustrated by FIGS. 6a and 6b.

Figure 6A:
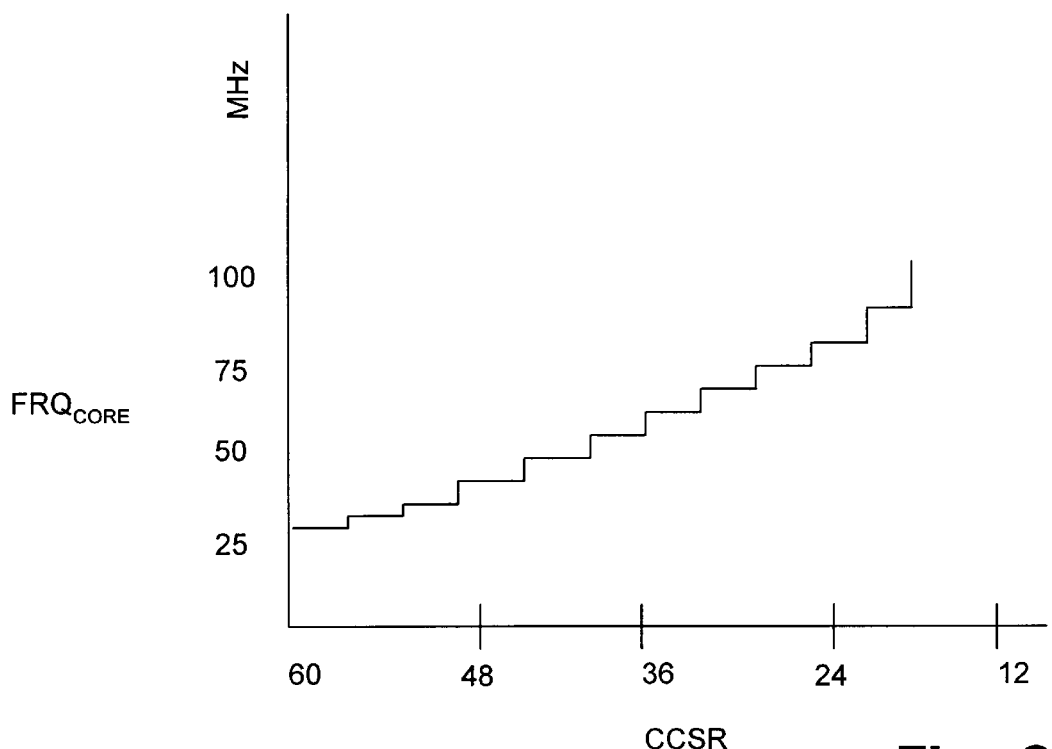
FIGS. 6a and 6b (are graphs illustrating the gradually increasing current requirements of a microprocessor employed in a microprocessor system in accordance with another specific aspect of the present invention.
Figure 6B:
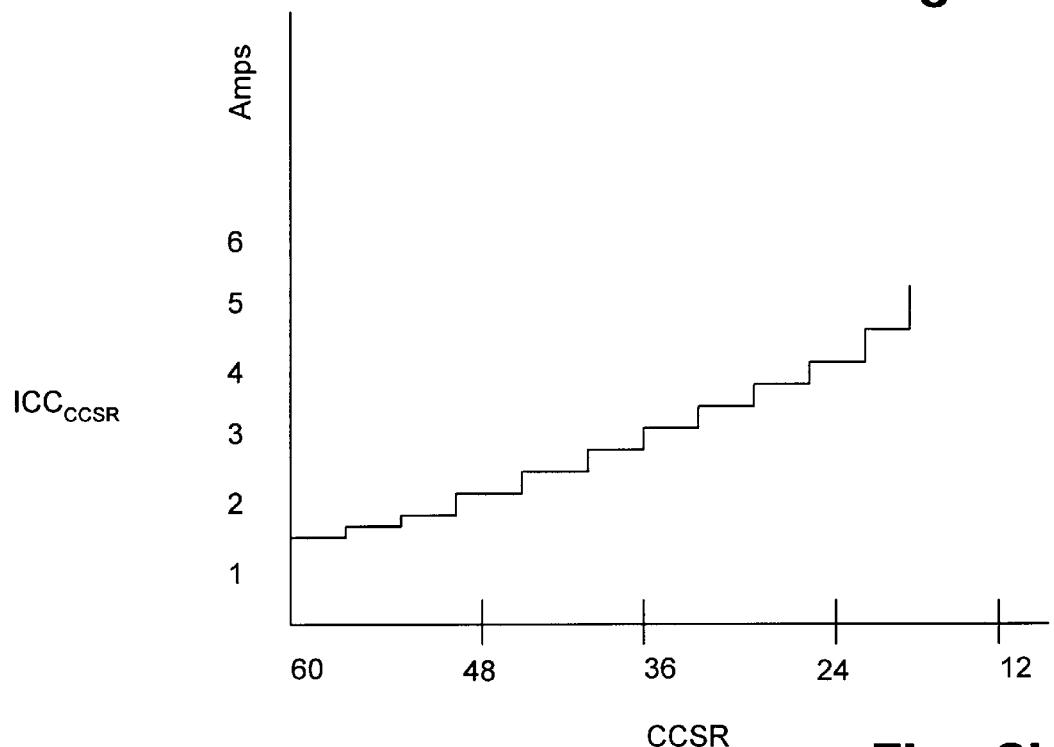

Turning now to FIGS. 6a and 6b, an exemplary embodiment of multiplying the stable clock frequency (PLL$_{OUT}$) with an integer number is illustrated. A step of 15 is loaded into the divide reload register (DRR) 262 in this exemplary embodiment. In addition, a microprocessor 60 capable of running at a full speed of 100 MHz, while consuming 5 Amps of power is chosen. Unlike the previous embodiments, the clock count shift register (CCSR) 282 does not load the value of the divide reload register (DRR) 262 in the present embodiment. Instead, the clock count shift register (CCSR) 282 loads a value which is a function of the divide reload register (DRR) 262 multiplied by a constant M or

CCSR=DRR*M

To balance the equation, the stable clock signal (PLL$_{OUT}$) is also multiplied by the constant M. In other words, for M=4, instead of stepping in the decrement of 1, the clock is stepping in the decrement of 4, or four times faster.

In addition, since total time required for the power supply 70 to ramp up to full power is a function of the divide reload register (DRR) 262, as discussed previously, not a function of the clock count shift register (CCSR) 282, the amount of time required to ramp up 15 steps is the same as discussed above, or 15 milliseconds. However, as FIGS. 6a and 6b illustrate, when the clock count shift register (CCSR) 282 counts down from 1 to 0, the amount of frequency changed in the microprocessor core clock 52 is only 25 MHz, and the amount of current required by the power supply 70 is only about 1.25 Amps due to the clock count shift register (CCSR) 282 being multiplied by 4. As one skilled in the art can easily understand, the constant M can be chosen arbitrarily without affecting the total time for powering up.

With this intelligent clock signal generator circuit 50, the microprocessor core clock 52 is slowed down and adjusted to be in sync with the powering up speed of the power supply 70. As a result the present invention provides for avoiding the need for expensive power supply designs or expensive and bulky capacitors to store the necessary power for powering up the microprocessor 60. Although the microprocessor core clock 52 is slowed down, the microprocessor 60 is resumed to normal clock speed before any possible human-eye visual detection. Thus, the present invention does not affect users' abilities to jump back to work after screen savers are turned on, while significant market efficiency is achieved.

Although the present invention has been described with respect to dividing a master clock signal in order to generate an alternative ramped signal having increased frequency over time, the present invention may be carried out in other manners. For example, a substantially linear clock signal could be employed to clock the microprocessor during the transition from idle state to active state. Furthermore, it should be appreciated that any system, circuit or means suitable for controlling the operating frequency of a microprocessor so that the microprocessor load corresponds to the ability of a power supply of the microprocessor to accommodate the microprocessor load during a transition from idle state to active state may be employed to carry out the present invention and falls within the scope of the claims.

Moreover, even though the present invention has been described with respect to ramping up clock signal frequency it should be appreciated that the present invention may be employed to ramp down clock signal frequency in order to prevent over voltage and/or overcharging problems when going from an active state to an inactive state.

Those skilled in the art will recognize that the embodiment(s) described above and illustrated in the attached drawings are intended for purposes of illustration only and that the subject invention may be implemented in various ways. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for controlling an operating frequency of a microprocessor, comprising:
    a core clock operatively coupled to the microprocessor, the core clock providing the microprocessor with a core clock signal for clocking the processor, wherein the core clock signal increases in frequency over time so as to increase the operating frequency of the microprocessor over time.

2. The system of claim 1, wherein the microprocessor is awakening from an idle state to an active state.

3. The system of claim 2, wherein the clock signal is a ramped clock signal, the ramped clock signal resulting in a ramped current demand by the microprocessor as it is awakening from the idle state to the active state.

4. The system of claim 3, wherein a time period for the ramped clock signal to ramp from a low frequency to a high frequency corresponds to a time period required for the power supply to adjust to a microprocessor load change as it is awakening from the idle state to the active state.

5. The system of claim 2, wherein the frequency of the clock signal increases linearly over time, the clock signal resulting in a linear current demand by the microprocessor as it is awakening from the idle state to the active state.

6. The system of claim 4, wherein a time period for the clock signal to increase from a low frequency to a high frequency corresponds to a time period required for a power supply to adjust to a microprocessor load change as it is awakening from the idle state to the active state.

7. A system for controlling a clock rate of a microprocessor, comprising:
    a core clock operatively coupled to the microprocessor, the core clock providing the microprocessor with a core clock signal for clocking the microprocessor;
    a power supply operatively coupled to the microprocessor, the power supply providing power to the microprocessor; and
    an intelligent clock generating system for providing the core clock with at least one clock signal of a plurality of clock signals to be used as the core clock signal, wherein the plurality of clock signals includes a master clock signal and at least one ramped clock signal.

8. The system of claim 7, wherein the microprocessor is awakening from an idle state to an active state.

9. The system of claim 8, wherein the at least one clock signal is a ramped clock signal, the ramped clock signal resulting in a ramped power demand by the microprocessor as it is awakening from the idle state to the active state.

10. The system of claim 9, wherein a time period for the ramped clock signal to ramp from a low frequency to a high frequency corresponds to a time period required for the power supply to adjust to a microprocessor load change as it is awakening from the idle state to the active state.

11. The system of claim 9, wherein the ramped clock signal comprises a plurality of fractional values of the master clock signal over a plurality of time intervals.

12. The system of claim 7, the intelligent clock generating system further including:
    a phase lock loop system for stabilizing the master clock signal.

13. The system of claim 7, the intelligent clock generating system further including a clock select multiplexer adapted to provide the core clock with one of the master clock signal or the at least one ramped clock signal.

14. The system of claim 13, wherein the clock select multiplexer provides the core clock with the master clock signal when the microprocessor is in an active state.

15. The system of claim 13, wherein the clock select multiplexer provides the core clock with the at least one ramped clock signal when the microprocessor is awakening from an idle state to an active state.

16. The system of claim 15, wherein the time period for a frequency of the at least one ramped clock signal to equal a frequency of the master clock signal corresponds to a period of time for the power supply to adjust to a change in microprocessor load from an idle microprocessor state to an active microprocessor state.

17. A method for regulating microprocessor power requirements, comprising the steps of:
    using a core clock to provide the microprocessor with a core clock signal for clocking the processor;

using a power supply to provide power to the processor; and using an intelligent clock generating system to provide the core clock with at least one clock signal of a plurality of clock signals to be used as the core clock signal, wherein the plurality of clock signals includes a master clock signal and at least one ramped clock signal.

18. The method of claim 17, further including the step of using a phase lock loop system to stabilize the master clock signal.

19. The method of claim 18, further including the step of using a clock select multiplexer adapted to provide the core clock with one of the master clock signal or the at least one ramped clock signal.

20. The method of claim 18, further including the step of determining if the clock is awakening from an idle state.

21. The method of claim 20, further including the step of providing the core clock with the at least one ramped clock signal when the microprocessor is awakening from the idle state.

22. The method of claim 21, further including the step of providing the core clock with the master clock signal when the microprocessor achieves an active state.

23. A system for controlling a clock rate of a processor, comprising:

a core clock operatively coupled to the processor, the core clock providing the microprocessor with a core clock signal for clocking the processor;

a power supply operatively coupled to the processor, the power supply providing power to the processor; and an intelligent clock generating system for providing the core clock with at least one clock signal of a plurality of clock signals to be used as the core clock signal, wherein the plurality of clock signals includes a master clock signal and at least one ramped clock signal, the intelligent clock generating system including:

a signal stabilizer for stabilizing the master clock signal;

a clock select multiplexer adapted to provide the core clock with one of the master clock signal or the at least one ramped clock signal.

24. The system of claim 23, wherein the clock select multiplexer provides the core clock with the at least one ramped clock signal when the microprocessor is awakening from an idle state to an active state.

25. The system of claim 24, wherein the time period for a frequency of the at least one ramped clock signal to equal a frequency of the master clock signal corresponds to a period of time for the power supply to adjust to a change in microprocessor load from an idle microprocessor state to an active microprocessor state.

26. The system of claim 23, wherein the at least one ramped clock signal comprises a plurality of fractional values of the master clock signal over a plurality of time intervals.

* * * * *